(12) United States Patent
Revol et al.

(10) Patent No.: US 12,158,530 B2
(45) Date of Patent: Dec. 3, 2024

(54) METHOD FOR DETECTING A DECOY SOURCE IN A SATELLITE RADIONAVIGATION SIGNAL AND ASSOCIATED RECEIVING DEVICE

(71) Applicant: THALES, Courbevoie (FR)

(72) Inventors: Marc Revol, Upic (FR); Pierre Bouniol, Valence (FR); Nicolas Fourny, Valence (FR)

(73) Assignee: THALES, Courbevoie (FR)

( * ) Notice: Subject to any disclaimer, the term of this patent is extended or adjusted under 35 U.S.C. 154(b) by 360 days.

(21) Appl. No.: 17/798,576

(22) PCT Filed: Feb. 9, 2021

(86) PCT No.: PCT/EP2021/052995
§ 371 (c)(1),
(2) Date: Aug. 10, 2022

(87) PCT Pub. No.: WO2021/165087
PCT Pub. Date: Aug. 26, 2021

(65) Prior Publication Data
US 2023/0111059 A1    Apr. 13, 2023

(30) Foreign Application Priority Data
Feb. 20, 2020    (FR) ...................................... 2001679

(51) Int. Cl.
*G01S 19/21*    (2010.01)
*G01S 19/36*    (2010.01)

(52) U.S. Cl.
CPC ............ *G01S 19/215* (2013.01); *G01S 19/36* (2013.01)

(58) Field of Classification Search
CPC .............................. G01S 19/215; G01S 19/36
See application file for complete search history.

(56) References Cited

U.S. PATENT DOCUMENTS

| | | | |
|---|---|---|---|
| 9,689,989 B2 | 6/2017 | Trautenberg et al. | |
| 2008/0174482 A1* | 7/2008 | Watson ................... | G01S 19/32 |
| | | | 342/357.29 |

(Continued)

OTHER PUBLICATIONS

Domínguez, et al., "Multi-antenna techniques for NLoS and spoofing detection using vehicular real signal captures in urban and road environments", GNSS 2015—Proceedings of the 28th International Technical Meeting of the Satellite Division of the Institute of Navigation, pp. 2966-2982, 2015.

(Continued)

*Primary Examiner* — Junpeng Chen
(74) *Attorney, Agent, or Firm* — BakerHostetler

(57) ABSTRACT

A method for detecting a decoy source of a satellite radionavigation signal, the method being executed by a satellite radionavigation signal reception device comprising two receivers, the method comprising the steps of: for each signal received by the reception device and transmitted by a different satellite, estimating the phase of the signal received by each receiver, computing the estimated phase difference for each receiver, comparing the phase differences computed for multiple different satellites and, if at least two phase differences computed for two different satellites are substantially identical, concluding that a decoy source is present.

7 Claims, 7 Drawing Sheets

(56) References Cited

U.S. PATENT DOCUMENTS

| | | | |
|---|---|---|---|
| 2015/0048973 A1* | 2/2015 | Whitehead | H04K 3/90 342/357.58 |
| 2015/0268350 A1* | 9/2015 | Whitehead | G01S 3/46 342/357.59 |
| 2018/0372879 A1* | 12/2018 | Whitehead | G01S 19/215 |

OTHER PUBLICATIONS

Jahromi, et al., "Gnss signal authenticity verification using carrier phase measurements with multiple receivers", 2016 8th ESA Workshop on Satellite Navigation Technologies and European Workshop on GNSS Signals and Signal Processing (NAVITEC), 2016.

* cited by examiner

METHOD FOR DETECTING A DECOY SOURCE IN A SATELLITE RADIONAVIGATION SIGNAL AND ASSOCIATED RECEIVING DEVICE

CROSS-REFERENCE TO RELATED APPLICATIONS

This application is a National Stage of International patent application PCT/EP2021/052995, filed on Feb. 9, 2021, which claims priority to foreign French patent application No. FR 2001679, filed on Feb. 20, 2020, the disclosures of which are incorporated by reference in their entirety.

FIELD OF THE INVENTION

The invention relates to the field of receivers for receiving satellite radionavigation signals, also called GNSS signals. It is applicable to any GNSS system, for example the GPS, GALILEO or GLONASS system.

BACKGROUND

The invention relates to a dual-receiver reception device implementing a method for detecting a decoy source of the satellite radionavigation signal.

The invention aims to provide a solution to the problem of the spoofing of GNSS signals by a single decoy source located in the environment of a receiver. Such a decoy source operates by receiving the GNSS signals actually transmitted by satellites and then by relaying these signals with or without modification. One objective of a decoy source is to distort the positioning computation performed by a GNSS receiver. Indeed, the receiver risks computing a position that corresponds not to its own but to that of the decoy source, or more generally to an incorrect position.

Monitoring and detecting a decoy source is not a conventional processing operation performed by GNSS receivers, even in the case of receivers dedicated to critical safety applications (such as those in transport, aeronautics, time synchronization, etc.). However, this field is now generating great interest after several cases of intentional or unintentional spoofing were demonstrated in real operational situations.

A first solution against spoofing attacks is provided by the use of authenticated signals access to which and use of which are protected by keys known only to authorized users. This is notably the case for military GNSS signals, distributed by most constellations, but also for certain civil signals known as "Safety of Life" or "commercial" signals, such as for example Galileo OS NMA or CS/E6B signals.

Methods using authenticated signals are effective, but require access and maintenance of user keys and cryptographic protection at device level. Moreover, such services are still in the experimental stage in the civil field, with cryptology for the time being remaining reserved for defense applications, and still exhibit not inconsiderable difficulties in ensuring certification thereof with respect to operational safety regulations.

A second solution that is beginning to be proposed for certain commercial receivers consists in setting up, in the receivers, coherence checks on the characteristics of received signals.

These characteristics concern for example the power level of the received signals, which may be evaluated through gain-control and signal-to-noise ratio indicators. Indeed, a decoy signal generally dominates useful GNSS signals, and therefore a high power level on the received signal is an indicator of the presence of a decoy. Another characteristic of the presence of a decoy relates to the coherence between the code phase and the carrier phase. Indeed, it is difficult for a decoy source to ensure coherent evolution of the evolution of the delay (pseudorange) and of the phase of the carrier (integrated Doppler) of GNSS signals, without the presence of cumbersome means for tracking the displacement of the target to be spoofed. Thus, in the absence of such information, the decoy source more often than not makes do with spoofing the code delay of the signals and not the phase of the carrier.

Another method consists in performing a coherence test on the evolution of the signal-to-noise ratio for all satellites. Indeed, the simultaneity of the evolution of the signal-to-noise ratio on all satellites, in the event of unpredictable movements of the carrier, reveals the transmission of signals from a single point transmitter, which is therefore likely to be a decoy station.

The various methods known from the prior art require specific arrangements for the receivers, which make them difficult to use in the context of commercial applications or applications regulated by standards. These methods notably require cryptology or key management modules or, more generally, additional equipment that requires significant modifications to the receivers.

SUMMARY OF THE INVENTION

The invention proposes a method for detecting decoy signals based on additional processing performed based on standard measurements provided by conventional GNSS receivers, for example in the case of "failsafe" architectures implementing two redundant reception chains.

The invention uses an identification criterion that consists in detecting a decoy situation when the direction of arrival of the signal received by a receiver is the same for multiple satellites. This situation corresponds to an anomaly that suggests that all of the signals are transmitted from the same decoy source.

The invention notably has the advantage of not requiring any complex spatial processing to make the received signals coherent.

One subject of the invention is a method for detecting a decoy source of a satellite radionavigation signal, the method being executed by a satellite radionavigation signal reception device comprising two receivers, the method comprising the steps of:
For each signal received by the reception device and transmitted by a different satellite,
  i. Estimating the phase of the signal received by each receiver,
  ii. Computing the estimated phase difference for each receiver, Comparing the phase differences computed for multiple different satellites and, if at least two phase differences computed for two different satellites are substantially identical, concluding that a decoy source is present.

According to one particular aspect of the invention, each receiver comprises a correlator for correlating the received signal with a local code associated with a satellite and the phase of the signal received by each receiver is estimated at the correlator output.

According to one particular embodiment, the method according to the invention furthermore comprises the steps of:

Computing, for at least one pair of distinct satellites, a double phase difference equal to the difference between the phase differences estimated for each receiver and for each respective satellite of the pair, Concluding that a decoy source is present if at least one computed double phase difference is substantially zero.

According to one particular embodiment, the method according to the invention furthermore comprises the steps of:

Computing the sum of multiple double phase differences computed for various pairs of distinct satellites, Concluding that a decoy source is present if the phase of the sum is substantially zero.

According to one particular embodiment, the method according to the invention furthermore comprises the preliminary steps of, for each signal received by the reception device and transmitted by a different satellite:

Computing, for each receiver, a signal reception position,

Determining, for each receiver, the position of the satellite when the signal is transmitted, Determining an estimate of the apparent displacement in the line of sight of the satellite between the transmission times of the signal by the satellite corresponding respectively to the signals received by each receiver, Correcting the computed phase differences for the estimated apparent displacement.

According to one particular aspect of the invention, the signal reception position is computed based on the pseudoranges computed by the receiver for all satellites.

According to one particular aspect of the invention, the position of the satellite when the signal is transmitted is determined based on a received time measurement associated with the computed pseudorange and on ephemerides.

Another subject of the invention is a satellite radionavigation signal reception device comprising two distinct receivers each capable of receiving satellite radionavigation signals and a computing unit configured to execute the steps of the method for detecting a decoy source of a satellite radionavigation signal according to the invention.

BRIEF DESCRIPTION OF THE DRAWINGS

Other features and advantages of the present invention will become more clearly apparent on reading the following description with reference to the following appended drawings.

DETAILED DESCRIPTION

Figure 1:
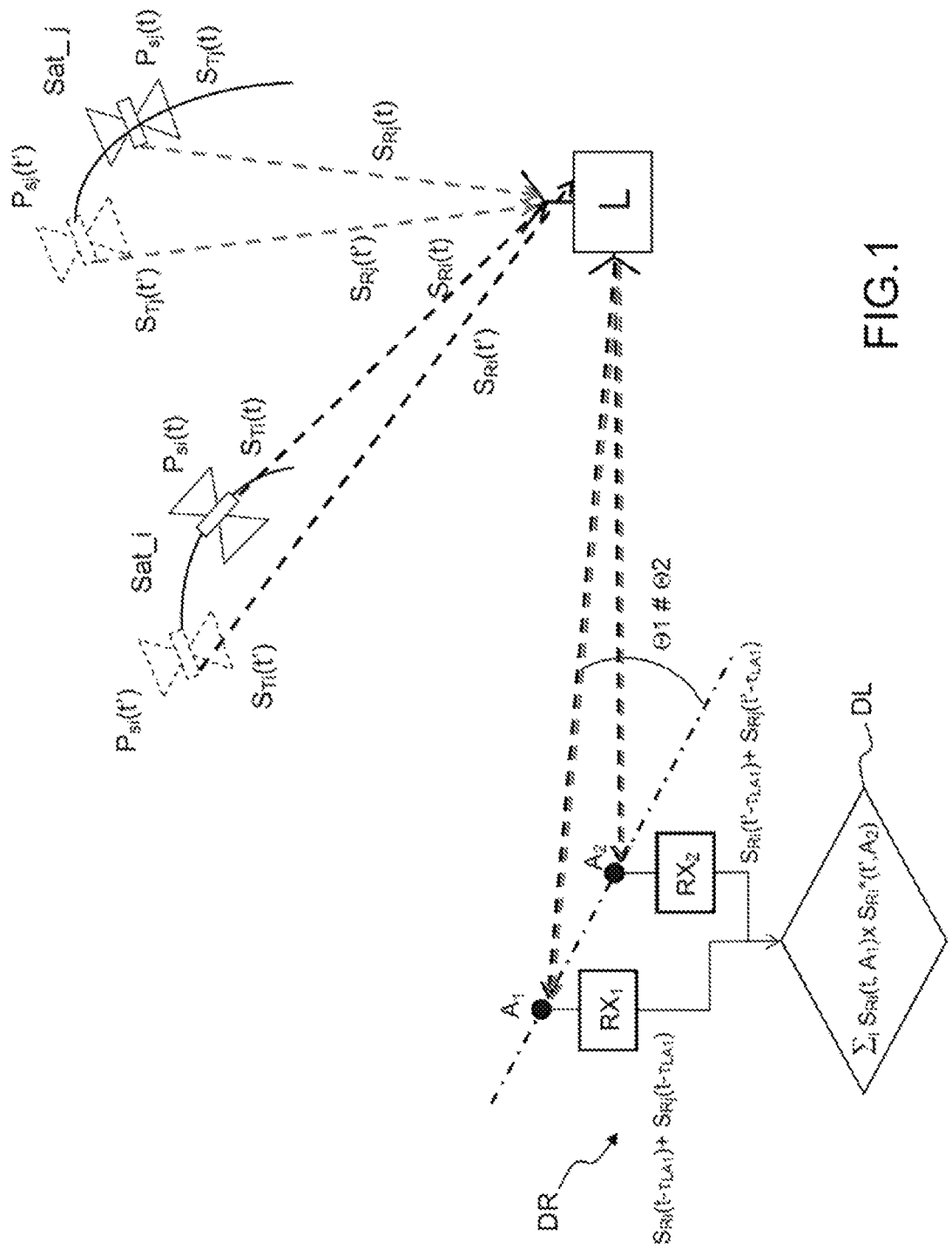
FIG. 1 shows a diagram of a two-receiver GNSS receiving system in an environment disturbed by a decoy station, FIG. 2 schematically shows, on a flowchart, the main steps for implementing the decoy detection method according to a first embodiment of the invention.

FIG. 1 illustrates the implementation context of the invention. A decoy station L receives satellite radionavigation signals $S_{Ri}(t)$, $S_{Ri}(t')$, $S_{Rj}(t)$, $S_{Rj}(t')$ coming from various satellites Sat_i, Sat_j in visibility and at various times t, t'. The decoy station L retransmits the signals to a reception device DR, which comprises two distinct receivers Rx1, Rx2 each having an antenna A1, A2 and a decoy detector DL configured to detect that the signals received by the reception device DR come from a decoy station L and not from the satellites Sat_i, Sat_j.

The decoy station L acts either as a repeater, by retransmitting the received GNSS signals in identical form, or else modifies the signals before retransmitting them.

In order to explain the operation of the decoy detection method according to the invention, a reminder will first be given of a few concepts relating to satellite radionavigation signals.

Analytical Expression of a GNSS Signal Received by a Receiver $S_e^i(t)$ denotes the signal transmitted by a satellite referenced by the index i.

$$S_e^i(t) = A_i(t)\exp(2j\pi f_0 t)$$

$A_i(t)$ is the gain of the signal, $f_0$ is the frequency of the signal.

The signal received by a receiver located at a distance $x_i(t)$ from the satellite i at the time t is given by the following relationship, where c is the speed of the signal.

$$S_r^i(t) = A_i\left(t - \frac{x_i(t)}{c}\right)\exp\left(2j\pi f_0\left(t - \frac{x_i(t)}{c}\right)\right)$$

A receiver synchronizes the estimated local signal $\hat{S}_l^i(t)$ to its time base shifted by $T_0$ with respect to that of the constellation of GNSS satellites, by performing matched filtering. Matched filtering corresponds to the product of the received signal and a local replica of the conjugate signal (defined by its spreading code). This product is calculated by way of a correlator, which calculates a correlation between a local spreading code and the received signal.

$$\hat{S}_l^i(t) = S_l^i(t - T_0) = A_i\left(t - T_0 - \frac{x_i(t - T_0)}{c}\right)\exp\left(2j\pi f_0\left(t - T_0 - \frac{x_i(t - T_0)}{c}\right)\right)$$

Due to the periodicity $T_c$ of the amplitude signals (code) and the carrier phase $(1/f_0)$, the local signal may also be written in the form:

$$S_l^i(t - T_0) = A_i\left(\text{mod}\left(t - T_0 - \frac{x_i(t - T_0)}{c}, T_c\right)\right)\cdot\exp\left(2j\pi f_0\left(\text{mod}\left(t - T_0 - \frac{x_i(t - T_0)}{c}, \frac{1}{f_0}\right)\right)\right)$$

where mod( ) designates the modulo function, $$\hat{P}_r^i(t) = c\cdot\left(T_0 + \frac{x_i(t - T_0)}{c}\right)$$

is the estimated (biased) pseudorange, in the line of sight of the satellite i, $$\hat{\varphi}_i(t) = 2j\pi f_0\left(\text{mod}\left(T_0 - \frac{x_i(t - T_0)}{c}, \frac{1}{f_0}\right)\right)$$

is the estimated carrier phase, in the line of sight of the satellite i, with $T_0$ being constant, it is also possible to write:

$$\hat{\varphi}_i(t) = 2\pi f_0 \left( \text{mod}\left(\frac{x_i(t-T_0)}{c}, \frac{1}{f_0}\right) + \varphi_0 \right)$$

The phase of the received signal is measured on the demodulated signal after despreading, that is to say at the correlation output with the local code.

Analytical Expression of the Phase Difference Between a GNSS Signal Received Respectively by Two Receivers A and B.

Consideration will now be given to the phase of the received signal for two reception positions $P_A$ and $P_B$, corresponding to two receivers A and B and satellite i-receiver distances defined by $x_i^A(t)$ and $x_i^B(t)$.

For one and the same satellite i, the phases of the received signals estimated at reception by the receivers A and B (whose time bases are shifted respectively by $T_{0A}$ and $T_{0B}$ with respect to the GNSS system time) are written:

$$\hat{\varphi}_i^A(t) = 2\pi f_0 \left( \text{mod}\left(\frac{x_i^A(t-T_{0A})}{c}, \frac{1}{f_0}\right) + \varphi_0^A \right)$$

$$\hat{\varphi}_i^B(j) = 2\pi f_0 \left( \text{mod}\left(\frac{x_i^B(t-T_{0B})}{c}, \frac{1}{f_0}\right) + \varphi_0^B \right)$$

The Fresnel vectors representing the phases estimated by the receivers A and B are written:

$F_i^A(t) = \exp(j\hat{\varphi}_i^A(t))$ $F_i^B(t) = \exp(j\hat{\varphi}_i^A(t))$ The phase difference between the two receivers for the satellite i is written:

$\Delta_{\varphi_i}^{AB}(t) = F_i^A(t).F_i^{B*}(t) =$ $\exp(j\Delta\hat{\varphi}_i^{AB}(t)) = \exp(j\hat{\varphi}_i^A(t)).\exp(-j\hat{\varphi}_i^B(t)) = \exp(j(\hat{\varphi}_i^A(t) - \hat{\varphi}_i^B(t)))$ $\Delta_{\varphi_i}^{AB}(t) =$ $\exp\left(2j\pi f_0 \left( \left(\text{mod}\left(\frac{x_i^A(t-T_0)}{c}, \frac{1}{f_0}\right) + \varphi_0^A\right) - \left(\text{mod}\left(\frac{x_i^B(t-T_0)}{c}, \frac{1}{f_0}\right) + \varphi_0^B\right) \right)\right)$ $\Delta_{\varphi_i}^{AB}(t) = \exp\left(2j\pi f_0 \left(\text{mod}\left(\frac{x_i^A(t-T_0) - x_i^B(t-T_0)}{c}, \frac{1}{f_0}\right) + \varphi_0^A - \varphi_0^B\right)\right)$ $\Delta_{\varphi_i}^{AB}(t) = \exp\left(2j\pi f_0 \left(\text{mod}\left(\frac{d_{AB}.\cos(\theta_i^{AB})}{c}, \frac{1}{f_0}\right) + \varphi_0^A - \varphi_0^B\right)\right)$ where $\theta_i^{AB}$ is the bearing angle of arrival of the signal i on the axis AB of the antennas The term $\varphi_0^A - \varphi_0^B$ linked to the desynchronization of the time base of the two receivers is eliminated by computing the double difference between two directions of arrival of the signals coming from two different satellites i and j.

$DD_{\varphi_{ij}}^{AB}(t) = \Delta_{\varphi_i}^{AB}(t).\Delta_{\varphi_j}^{AB}(t) = \exp(j\Delta\hat{\varphi}_i^{AB}(t)).\exp(-j\Delta\hat{\varphi}_j^{AB}(t))$ In other words, $$DD_{\varphi_{ij}}^{AB}(t) = \exp\left(2j\pi f_0.\text{mod}\left(d_{AB}.\frac{(\cos(\theta_i^{AB}) - \cos(\theta_j^{AB}))}{c}, \frac{1}{f_0}\right)\right)$$

From the previous expression of the double phase difference, it may be seen that this does not depend on the synchronization bias between the receivers A and B. Moreover, in the absence of a decoy source, the double phase difference is linked directly to the difference between the angles of arrival of the signals coming from the satellites i and j on the axis AB between the two receivers.

If the attitude and the heading of the lever arm AB between the two receivers are known, it is possible to check the correspondence between the estimated double phase differences and the expected double phase differences.

Analytical Expression of a Decoy Signal Simulating all of the Satellites of a Constellation.

Consideration will now be given to the case of a decoy station L operating as a source that transmits all of the GNSS signals corresponding to the visible satellites (as explained in the diagram of FIG. 1).

The GNSS signals received by the decoy station are retransmitted to the receivers Rx1, Rx2 after having modified the code and phase delays of each of the satellite signals, in order to make them coherent with those that should be received by a target receiver whose position and speed it is desired to spoof.

All of the signals are sent on the same carrier from the decoy source to the receiver, and they together experience a propagation delay equal to $d_{LR}/c$, where $d_{LR}$ is the distance between the decoy station L and the receiver DR. The signals also experience an additional Doppler phase shift equal to $f_0 \cdot (v_{LR}/c)$, which is assumed to be taken into account and compensated for so as not to alert the target receiver.

With such assumptions, the signals transmitted by the decoy source are written using the following relationship:

$$S_L^E(t) = \sum_{i=1}^N A_i\left(t - \frac{x_i^R(t) - d_{LR}}{c}\right).\exp\left(2j\pi\left(f_0.\left(1 - \frac{v_{LR}}{c}\right)\right)\left(t - \frac{x_i^R(t)}{c}\right)\right)$$

Where $x_i^R(t)$ is the distance between the satellite i and the decoy target receiver R The decoy signal received by the receiver DR is written, in the case of a single reception antenna at position R:

$$S_L^R(t) = \sum_{i=1}^N A_i\left(t - \frac{x_i^R(t)}{c}\right).\exp\left(2j\pi f_0\left(t - \frac{x_i^R(t)}{c}\right)\right)$$

Analytical Expression of the Phase Difference Between Two Antennas A and B at Reception of a Decoy Signal In the case of two antennas A and B, the signals received on each of them are written:

$$S_R^A(t) = \sum_{i=1}^N A_i\left(t - \frac{x_i^R(t) + \frac{d_{LR} - d_{LA}}{c}}{c}\right).\exp\left(2j\pi f_0\left(t - \frac{x_i^R(t) + \frac{d_{LR} - d_{LA}}{c}}{c}\right)\right)$$

$$S_R^B(t) = \sum_{i=1}^N A_i\left(t - \frac{x_i^R(t) + \frac{d_{LR} - d_{LB}}{c}}{c}\right).\exp\left(2j\pi f_0\left(t - \frac{x_i^R(t) + \frac{d_{LR} - d_{LB}}{c}}{c}\right)\right)$$

$d_{LA}$ and $d_{LB}$ are the respective distances between the decoy station L and each antenna A, B.

The adapted local signal of the receiver DR (time base shifted by $T_0$) is written, using the previous notations:

$$S_L^A(t) = \sum_{i=1}^{N} A_i \left( \text{mod}\left( t - T_0 - \frac{x_i^R(t) + \frac{d_{LR} - d_{LA}}{c}}{c}, T_c \right) \right).\exp 2j$$

$$\pi f_0 \left( \text{mod}\left( \frac{x_i^R(t) + \frac{d_{LR} - d_{LA}}{c}}{c}, \frac{1}{f_0} \right) + \varphi_0^A \right)$$

$$S_L^B(t) = \sum_{i=1}^{N} A_i \left( \text{mod}\left( t - T_0 - \frac{x_i^R(t) + \frac{d_{LR} - d_{LB}}{c}}{c}, T_c \right) \right).\exp 2j$$

$$\pi f_0 \left( \text{mod}\left( \frac{x_i^R(t) + \frac{d_{LR} - d_{LB}}{c}}{c}, \frac{1}{f_0} \right) + \varphi_0^B \right)$$

The phases of the signals received on the receivers A and B are written:

$$\hat{\varphi}_i^A(t) = 2\pi f_0 \left( \text{mod}\left( \frac{x_i^R(t) + \frac{d_{LR} - d_{LA}}{c}}{c}, \frac{1}{f_0} \right) + \varphi_0^A \right)$$

$$\hat{\varphi}_i^B(t) = 2\pi f_0 \left( \text{mod}\left( \frac{x_i^R(t) + \frac{d_{LR} - d_{LB}}{c}}{c}, \frac{1}{f_0} \right) + \varphi_0^B \right)$$

The Fresnel vectors representing the phases estimated by the receivers A and B are written:

$$F_i^A(t) = \exp(j\Delta\hat{\varphi}_i^A(t))$$

$$F_i^B(t) = \exp(j\Delta\hat{\varphi}_i^A(t))$$

The phase difference between the two antennas for the signal i is written:

$$\Delta_{\varphi_i}^{AB}(t) = F_i^A(t).F_i^{B*}(t) =$$

$$\exp(j\Delta\hat{\varphi}_i^{AB}(t)) = \exp(j\hat{\varphi}_i^A(t)).\exp(-j\hat{\varphi}_i^B(t)) = \exp(j(\hat{\varphi}_i^A(t) - \hat{\varphi}_i^B(t)))$$

$$\Delta_{\varphi_i}^{AB}(t) = \exp\left( 2j\pi f_0 \left( \left( \text{mod}\left( \frac{x_i^R(t) + d_{LR} - d_{LA}}{c}, \frac{1}{f_0} \right) + \varphi_0^A \right) - \right.\right.$$

$$\left.\left. \left( \text{mod}\left( \frac{x_i^R(t) + d_{LR} - d_{LB}}{c}, \frac{1}{f_0} \right) + \varphi_0^B \right) \right) \right)$$

$$\Delta_{\varphi_i}^{AB}(t) = \exp\left( 2j\pi f_0 \left( \text{mod}\left( \frac{d_{LA} - d_{LB}}{c}, \frac{1}{f_0} \right) + \varphi_0^A - \varphi_0^B \right) \right)$$

$$\Delta_{\varphi_i}^{AB}(t) = \exp\left( 2j\pi f_0 \left( \text{mod}\left( \frac{d_{AB}.\cos(\theta_L^{AB})}{c}, \frac{1}{f_0} \right) + \varphi_0^A - \varphi_0^B \right) \right)$$

where $\theta_L^{AB}$ is the bearing angle of arrival of the decoy signal L on the axis AB of the antennas (and no longer the angle associated with the satellites).

It is thus shown that the term $\Delta_{\varphi_i}^{AB}(t)$ does not depend on the satellite direction, and remains linked only to the direction of arrival of the decoy signal.

One test for the existence of a decoy source or a repeater with a single transmission source then consists in checking that the term $\Delta_{\varphi_i}^{AB}(t)$ remains independent of the direction of the satellite.

The invention is based on the principles described above.

Figure 2:
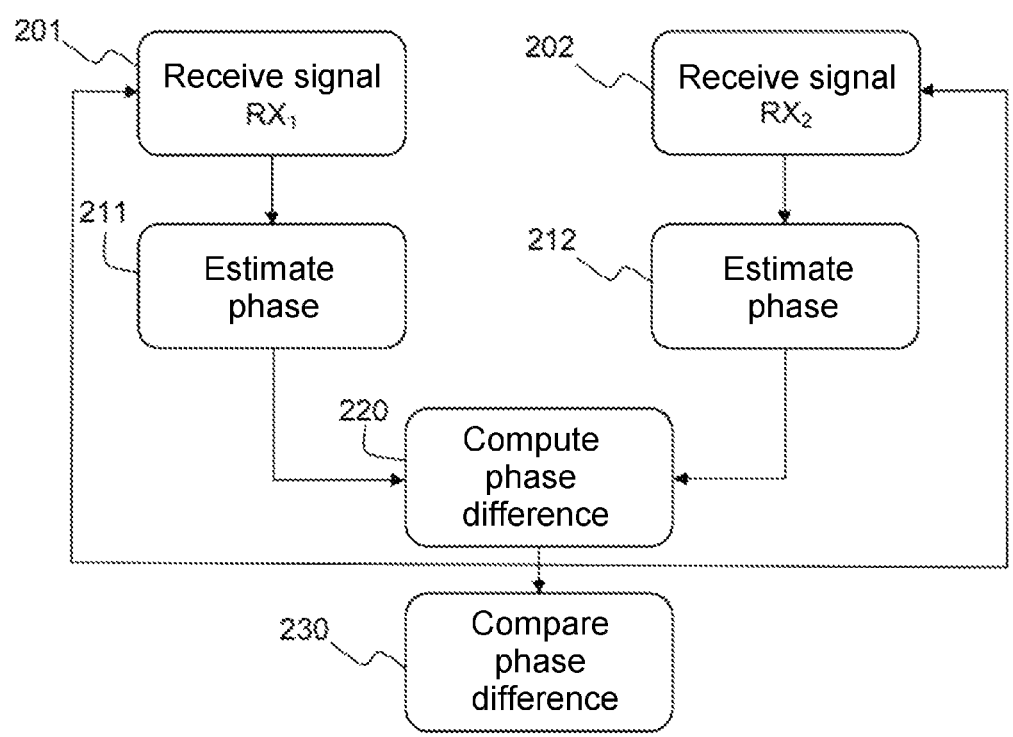

FIG. 2 describes the steps for performing a decoy detection method according to a first embodiment of the invention.

The GNSS signals transmitted by the decoy station L are received 201, 202 by each receiver RX1, RX2.

Each received signal is correlated with a local spreading code that makes it possible to identify the transmitter satellite i. This technique is well known in the field of GNSS receivers and is not described here.

Based on the signals received on each receiver for the same satellite i, the phase of the signals $\hat{\varphi}_i^A$, $\hat{\varphi}_i^B(t)$, at the correlation output, is estimated 211, 212.

Next, in a step 220, the phase difference $\Delta\varphi_i^{AB}(t)$ is computed.

Steps 201, 202, 211, 212, 220 are iterated for multiple different satellites.

Finally, in a last step 230, the values of the phase differences $\Delta\varphi_i^{AB}(t)$ computed for multiple satellites i are compared. If at least two values are substantially identical for two different satellites i, j, this means that these signals were transmitted from the same source, and therefore that they are spoofed.

Comparison step 230 is for example performed by comparing the difference in absolute value of two phase differences with a predetermined threshold.

$$|\Delta_{\varphi_i}^{AB}(t) - \Delta_{\varphi_j}^{AB}(t)| > \varepsilon$$

The threshold $\varepsilon$ is set slightly greater than 0 to account for computing noise. If the threshold is exceeded, this means that the two values are different and that the signals are not coming from the same source. If not, the corresponding signals are detected as being spoofed.

Figure 3:
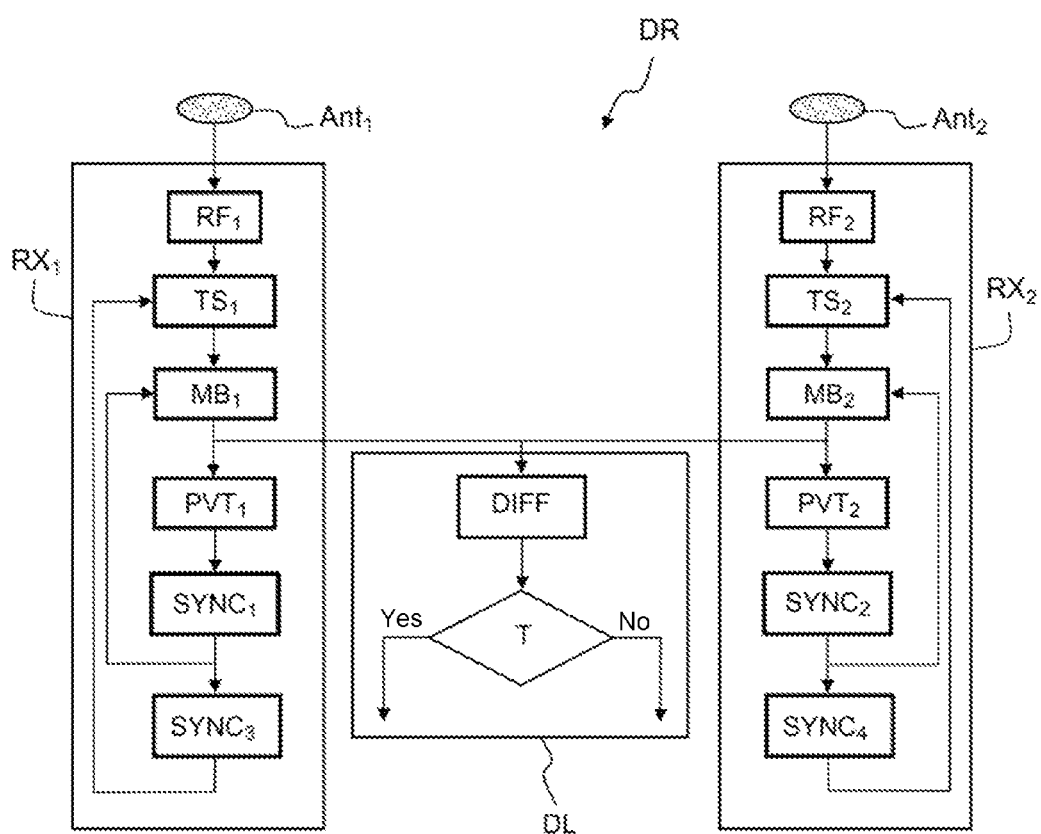
FIG. 3 shows a diagram of a GNSS reception device according to the first embodiment of the invention, FIG. 4 schematically shows, on a flowchart, the main steps for implementing the decoy detection method according to a second embodiment of the invention.

FIG. 3 schematically shows one example of a first embodiment of the reception device DR configured to implement the decoy detection method described in FIG. 2.

The device DR comprises two receivers RX1, RX2. Each receiver comprises an antenna ANT1, ANT2 for receiving GNSS signals, a radiofrequency processing chain RF1, RF2 (comprising one or more filters and/or one or more amplifiers), a signal processing module TS1, TS2, a raw measurement computing module MB1, MB2, a position, speed and time computing module PVT1, PVT2, a first synchronization module SYNC1, SYNC2 for aligning, in real time, the local time of each receiver RX1, RX2 with the time of the GNSS constellation, and a second synchronization module SYNC3, SYNC4.

The signal processing module TS1, TS2 comprises at least one analog-to-digital converter for digitizing the received signal, as well as a correlator for correlating the digital signal with a locally generated spreading code.

The raw measurement computing module MB1, MB2 receives the signal demodulated by the signal processing module and implements the code tracking loops (or DLL) and phase tracking loops (PLL), which are used to extract raw received time and Doppler measurements. Hereinafter, measurement time is the name given to the time at which the raw time and Doppler measurements are extracted.

The computing module PVT1, PVT2 determines position, speed and time information based on the raw measurements.

The first synchronization module SYNC1, SYNC2 synchronizes the local time bases of the two receivers based on a computation of a local time offset estimated by the module PVT1, PVT2 at the measurement time.

The second synchronization module SYNC3, SYNC4 is used to synchronize the measurement times (of received time and code phase) between the two receivers RX1, RX2, on one and the same reference time (for example every second) of the GNSS constellation.

The device DR furthermore comprises a decoy detection module DL configured to execute steps 211, 212, 220, 230 of the method described in FIG. 2.

The module DL comprises for example a computing unit DIFF for computing the phase differences 220 and a comparison member for performing the test 230.

Figure 4:
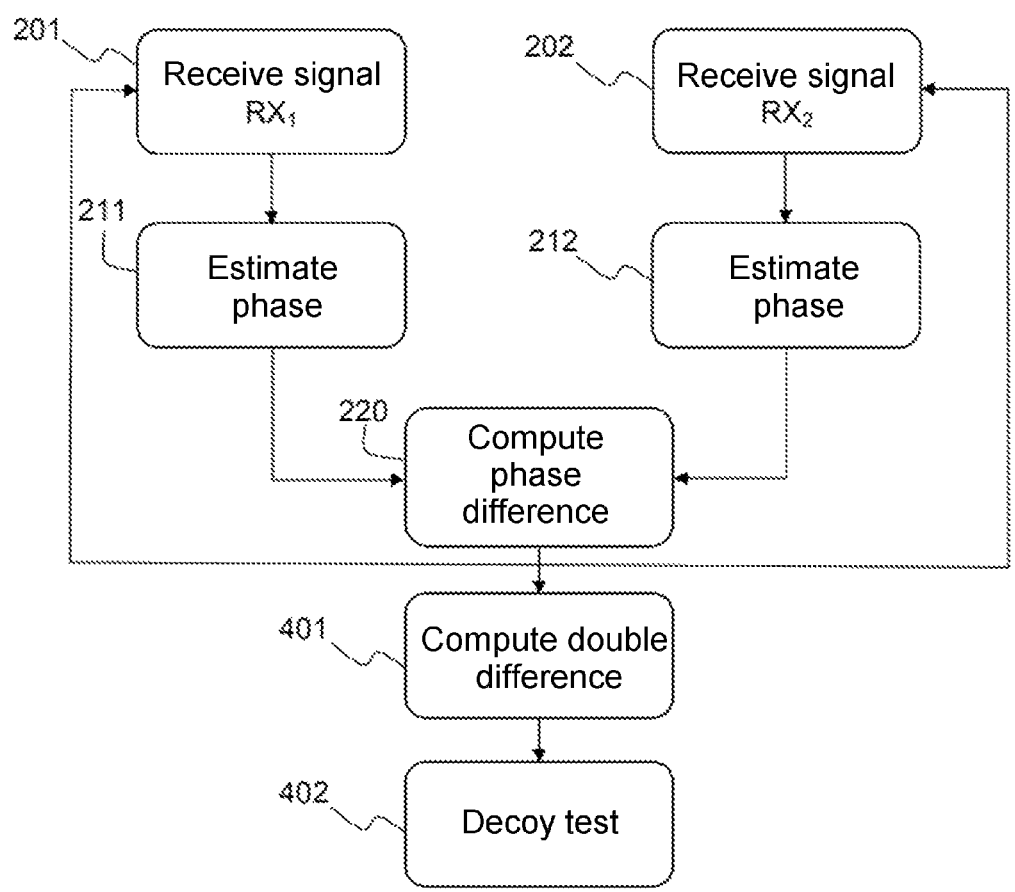
Figure 5:
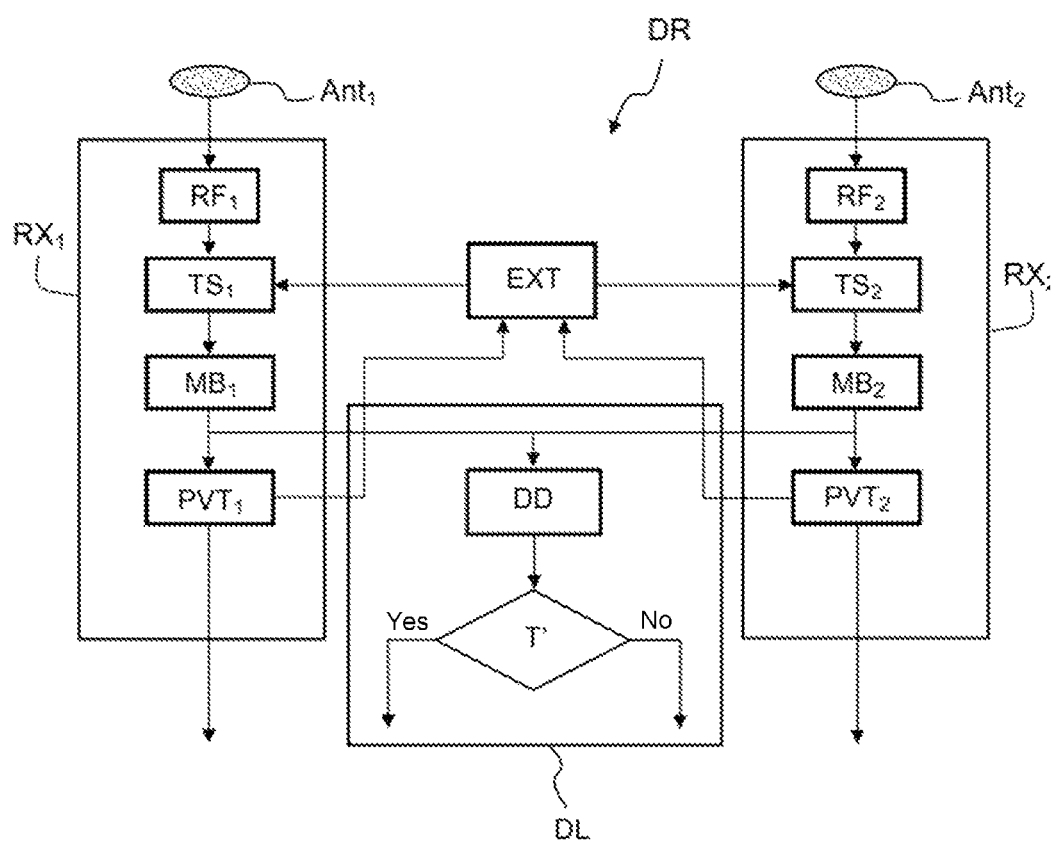
FIG. 5 shows a diagram of a GNSS reception device according to the second embodiment of the invention, FIG. 6 schematically shows, on a flowchart, the main steps for implementing the decoy detection method according to a third embodiment of the invention.

FIGS. 4 and 5 illustrate a second embodiment of the invention in which the assumption is made that the local time bases of the receivers RX1, RX2 are not synchronized. In other words, the synchronization modules SYNC1, SYNC2 for synchronizing the local time of the receivers on the time of the constellation of GNSS satellites are not present in the receivers RX1, RX2.

On the other hand, it is assumed that the raw measurement times of the two receivers are synchronized on one and the same time using an external synchronization signal EXT (that is to say a physical signal allowing the receivers to trigger the measurement at the time corresponding to this signal). The measurement times are thus synchronized by this external means EXT, and the synchronization modules SYNC3, SYNC4 are also eliminated.

In this case, the term $\varphi_0^A + \varphi_0^B$ in the expression of the phase difference $\Delta_{\varphi_i}^{AB}(t)$ is no longer necessarily constant.

The second embodiment of the invention makes it possible to solve this problem by adding, to the method described in FIG. 2, an additional step 401 of computing double phase differences.

Indeed, the term $\varphi_0^A - \varphi_0^B$ is eliminated by computing the double difference between the complex phase differences computed for two different satellites i and j.

$$DD_{\varphi_{ij}}^{AB}(t) = \arg(\Delta_{\varphi_i}^{AB}(t) - \Delta_{\varphi_j}^{AB}(t))$$

$$= \arg(\exp(j\Delta\hat{\varphi}_i^{AB}(t)) \cdot \exp(-j\Delta\hat{\varphi}_j^{AB}(t)))$$

In other words $$DD_{\varphi_{ij}}^{AB}(t) = \arg\left(\exp\left(2j\pi f_0 . \mathrm{mod}\left(d_{AB} . \frac{(\cos(\theta_L^{AB}) - \cos(\theta_L^{AB}))}{c}, \frac{1}{f_0}\right)\right)\right) = 0$$

The double phase difference $DD_{\varphi_{ij}}^{AB}(t)$ thus has the value 0 when the signals of the satellites i and j come from the same decoy source.

Step 401 of the method described in FIG. 4 thus consists in computing multiple double phase differences between multiple pairs of satellites (i, j).

The decoy detection method according to the second embodiment of the invention thus comprises a test step 402 that consists in checking whether at least one double phase difference is substantially zero. As an alternative, an average or a sum of multiple double phase differences may be calculated.

The test step 402 consists for example in comparing the absolute value of each computed double phase difference with a threshold ε slightly greater than 0, in the same way as step 230.

FIG. 5 schematically shows one example of a reception device DR configured to implement the decoy detection method according to the second embodiment of the invention.

Compared to the diagram of FIG. 3, each receiver RX1, RX2 comprises the same elements already described with the exception of the synchronization modules SYNC1, SYNC2, SYNC3, SYNC4. The reception device DR moreover comprises an additional external module EXT for synchronizing the measurement times of the two receivers.

The local time bases of the two receivers are thus no longer synchronized, but the measurement times remain synchronous on one and the same time of the GNSS constellation.

The decoy detection module DL comprises a computing unit DD configured to execute steps 211, 212, 220, 401 of the method described in FIG. 4, as well as a comparator T' for performing the test in step 402.

Figure 6:
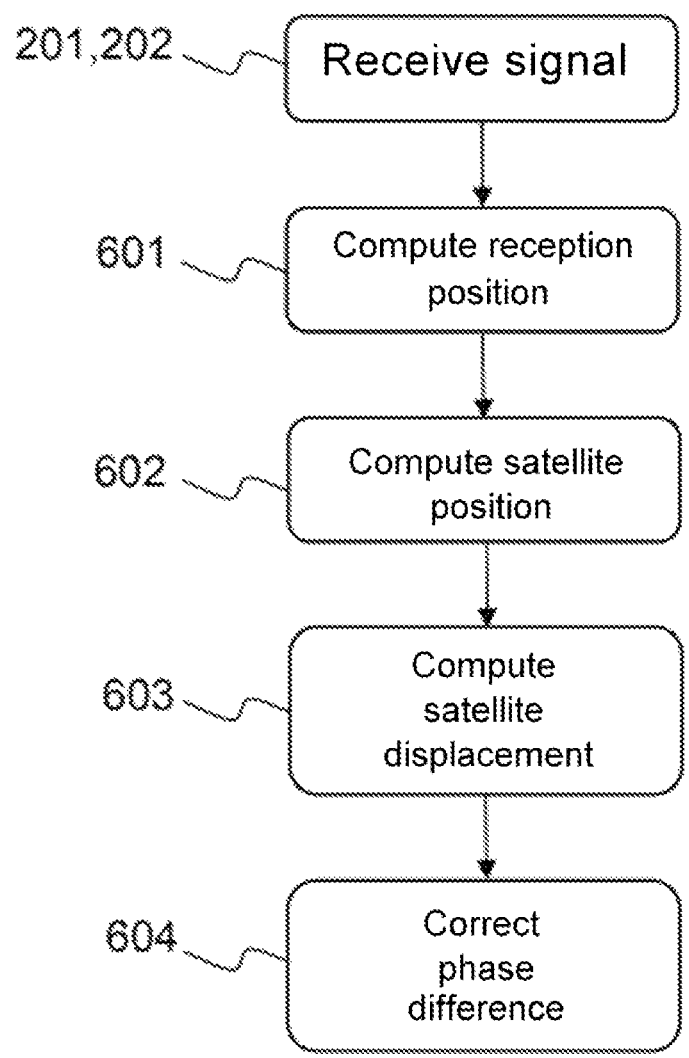
Figure 7:
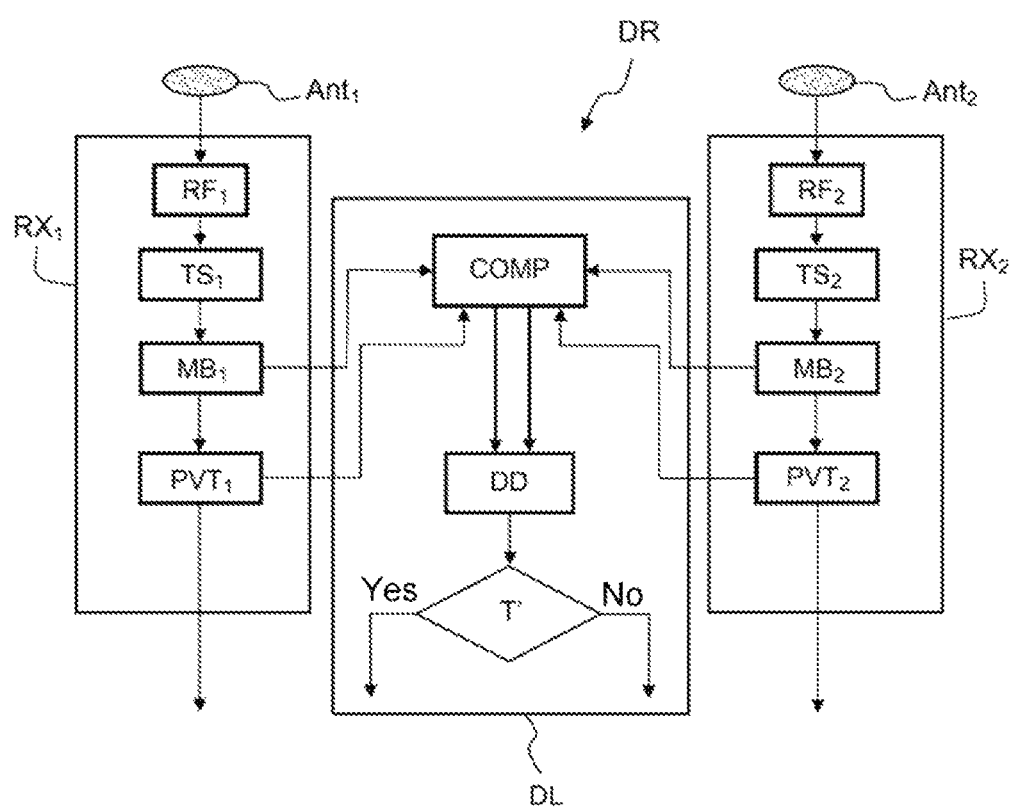
FIG. 7 shows a diagram of a GNSS reception device according to the third embodiment of the invention.

FIGS. 6 and 7 describe a third embodiment of the invention in which it is considered that the times of sampling of the signals received by the receivers RX1, RX2 are not synchronized. In other words, it is considered that the receivers RX1, RX2 do not contain any internal synchronization modules SYNC3, SYNC4 or external ones EXT for synchronizing the measurement times.

If the sampling times are not synchronized on the two receivers RX1, RX2, the apparent distance of one and the same satellite may have changed between the two sampling times, thus leading to a bias in the estimate of the propagation path difference between the two receivers.

Indeed, if the measurement times are different on the two receivers, the code and carrier phases of the received GNSS signals will correspond to different GNSS received times, and therefore also to different transmission dates of these signals.

For one and the same satellite, the position of the satellite corresponding to each of these two different dates is therefore also different. For example, a difference of only 10 ms between measurement dates corresponds to a displacement of 40 m for a satellite moving at 4 km/s. It is therefore necessary to take into account the displacement of the satellite corresponding to the GNSS received time differences at the two measurement times.

Thus, in this case, the double phase difference is expressed via the following relationship:

$$DD_{\varphi_{ij}}^{AB}(t, t') = \arg\left(\exp\left(2j\pi f_0 . \mathrm{mod}\left(\frac{(\Delta x_i^R(t, t')) - (\Delta x_j^R(t, t'))}{c}, \frac{1}{f_0}\right)\right)\right) \neq 0$$

Due to the difference between the two sampling times t, t' of the two receivers, the value of $DD_{\varphi_{ij}}^{AB}(t, t')$ is no longer equal to 0 when the signals transmitted by two satellites i and j come from one and the same decoy source.

To solve this problem, a third embodiment of the invention is proposed, in which the phase differences computed in steps 211, 212 by each receiver are corrected beforehand for a phase shift resulting from the displacement of the satellite between the two measurement times t and t' of each receiver.

FIG. 6 describes the steps required to perform this correction.

Based on the received, spoofed signal, the estimated pseudoranges are computed 601 for each receiver RX1, RX2, which then make it possible to deduce a supposed spoofed position close to the reception device DR.

Based on the GNSS received time measurements tr and tr' associated with each estimated pseudorange, at the measurement times t and t', the position of the satellite when the signal is transmitted, corresponding to the received times tr and tr', is computed 602 based on ephemerides.

Next, the displacement of the satellite between the transmission date tr of the signal received by the first receiver RX1 at the measurement time t and the transmission date tr' of the signal received by the second receiver RX2 at the measurement time t' is estimated 603.

Finally, a correction to be applied to the phase differences in order to compensate for the difference in path of the signal between the antennas of the receivers Rx1 and Rx2 due to the apparent displacement in the line in sight of the satellite between the two times tr and tr' is deduced 604.

In other words, the difference is computed between the computed apparent distance between the position of the satellite at the time tr and the spoofed position, on the one hand, and the computed apparent distance between the position of the satellite at the time tr' and the spoofed position.

The methods described in FIGS. 2 and 4 then apply identically to the corrected signals.

FIG. 7 schematically shows one example of a reception device DR configured to execute the decoy detection method according to the third embodiment of the invention.

Compared to the diagram of FIG. 5, each receiver RX1, RX2 comprises the same elements already described with the exception of the internal or external synchronization modules SYNC3, SYNC4, EXT for synchronizing the measurement times. The sampling times of the two receivers are thus not synchronized.

The decoy detection module DL comprises a computing unit COMP for executing steps 601, 602, 603, 604 of the method described in FIG. 6 and thus providing corrected phase differences, which are then transmitted to the double phase difference computing unit DD.

The invention applies notably to GNSS signal reception devices on board aircraft.

Each of the elements of the receiver according to the invention may be implemented in software and/or hardware form based on a processor and a memory. The processor may be a generic processor, a specific processor, an application-specific integrated circuit (ASIC) or a field-programmable gate array (FPGA).

The invention claimed is:

1. A method for detecting a decoy source of a satellite radionavigation signal, the method being executed by a satellite radionavigation signal reception device (DR) comprising two receivers (RX1, RX2), the method comprising the steps of:
   for each signal received by the reception device and transmitted by a different satellite,
   i. estimating the phase of the signal received by each receiver,
   ii. computing the estimated phase difference for each receiver,
      comparing the phase differences computed for multiple different satellites and, if at least two phase differences computed for two different satellites are substantially identical, concluding that a decoy source is present,
   the method furthermore comprising the preliminary steps of, for each signal received by the reception device and transmitted by a different satellite:
   computing, for each receiver, a signal reception position,
   determining for each receiver, the position of the satellite when the signal is transmitted,
   determining an estimate of the apparent displacement in the line of sight of the satellite between the transmission times of the signal by the satellite corresponding respectively to the signals received by each receiver,
   correcting the computed phase differences for the estimated apparent displacement.

2. The method for detecting a decoy source as claimed in claim 1, wherein each receiver comprises a correlator for correlating the received signal with a local code associated with a satellite and the phase of the signal received by each receiver is estimated at the correlator output.

3. The method for detecting a decoy source as claimed in claim 1, furthermore comprising the steps of:
   computing, for at least one pair of distinct satellites, a double phase difference equal to the difference between the phase differences estimated for each receiver and for each respective satellite of the pair,
   concluding that a decoy source is present if at least one computed double phase difference is substantially zero.

4. The method for detecting a decoy source as claimed in claim 3, furthermore comprising the steps of:
   computing the sum of multiple double phase differences computed for various pairs of distinct satellites,
   concluding that a decoy source is present if the phase of the sum is substantially zero.

5. The method for detecting a decoy source as claimed in claim 1, wherein the signal reception position is computed based on the pseudoranges computed by the receiver for all satellites.

6. The method for detecting a decoy source as claimed in claim 1, wherein the position of the satellite when the signal is transmitted is determined based on a received time measurement associated with the computed pseudorange and on ephemerides.

7. A satellite radionavigation signal reception device comprising two distinct receivers (RX1, RX2) each capable of receiving satellite radionavigation signals and a computing unit (DL) configured to execute the steps of the method for detecting a decoy source of a satellite radionavigation signal as claimed in claim 1.

* * * * *